(12) United States Patent
Agbaria et al.

(10) Patent No.: US 8,689,211 B2
(45) Date of Patent: Apr. 1, 2014

(54) LIVE MIGRATION OF VIRTUAL MACHINES IN A COMPUTING ENVIRONMENT

(75) Inventors: Adnan Agbaria, Haifa (IL); Edi Shmueli, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1063 days.

(21) Appl. No.: 12/471,416

(22) Filed: May 25, 2009

(65) Prior Publication Data

US 2010/0299666 A1    Nov. 25, 2010

(51) Int. Cl.
*G06F 9/455* (2006.01)

(52) U.S. Cl.
USPC .......................................................... 718/1

(58) Field of Classification Search
None
See application file for complete search history.

(56) References Cited

U.S. PATENT DOCUMENTS

| | | |
|---|---|---|
| 7,093,086 B1 | 8/2006 | van Rietschote |
| 2007/0192765 A1 | 8/2007 | Shimogawa et al. |
| 2010/0107158 A1* | 4/2010 | Chen et al. .................. 718/1 |

OTHER PUBLICATIONS

Clark et. al. "Live migration of virtual machines"—Proceedings of the 2nd conference on Symposium on Networked Systems Design & Implementation—vol. 2 pp. 273-286, 2005.
W. J. Armstrong et. al. "IBM POWER6 partition mobility: Moving virtual servers seamlessly between physical systems"—IBM Journal of Research and Development, vol. 51, No. 6, 2007.
E. N. Elnozahy, L. Alvisi, Y. M. Wang and D. B. Johnson. "A Survey of Rollback-Recovery Protocols in Message-Passing Systems". ACM Computing Surveys, 34(3): 375-408, Sep. 2002.
G. Vallée "Checkpoint/restart of virtual machines based on xen."—In High Availability and Performance Computing Workshop (HAPCW'06), Santa Fe, New Mexico, USA, Oct. 2006.

* cited by examiner

*Primary Examiner* — Mengyao Zhe
(74) *Attorney, Agent, or Firm* — F. Jason Far-hadian, Esq.; Centry IP Group (57) ABSTRACT

A method for migrating a virtual machine (VM) in a computing environment is provided. The method comprises receiving a request to migrate a VM executing on a source host to a destination host; defining a recovery point to which the VM is restored during recovery from a fault; and iteratively copying a memory of the source host associated with the VM to the destination host. During the copying, the original state of each page in the memory is preserved. At some point, the VM suspends executing on the source host, copies state information associated with the VM to the destination host, and resumes executing on the destination host. If a fault is detected on the source host, the VM is restored to the recovery point using preserved information.

10 Claims, 6 Drawing Sheets

LIVE MIGRATION OF VIRTUAL MACHINES IN A COMPUTING ENVIRONMENT

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of the claimed subject matter to material associated with such marks.

TECHNICAL FIELD

The claimed subject matter relates generally to virtual machines in a computing environment and, more particularly, to live migration of a virtual machine in a computing environment.

BACKGROUND

A virtual machine (VM) provides virtualization between a process and a host such that the process may be executed independently of the host. A host is typically a physical machine (e.g., a processor) or an application (e.g., an operating system) on which a VM is executed to provide hardware compatibility or platform independence. A VM that is executing on one host (i.e., a source host) may be relocated, or migrated, to another host (i.e., a destination host).

Existing migration implementations require the transfer of a portion of the source host's VM memory that is required by the VM to execute on the destination host to the destination host while the VM is still executing on the source host. The VM then suspends execution on the source host and resumes execution on the destination host once the state of the VM is transferred from the source host to the destination host.

Later, the remaining VM memory on the source host is transferred to the destination host. Unfortunately, the VM executing on the destination host may be exposed to faults on the source host. If a fault occurs and the source host fails, the remaining VM memory may be lost causing the VM to fail. To avoid VM failure, the remaining VM memory may be transferred to the destination host before the VM resumes execution on the VM host. Such an implementation, however, may lead to the VM suspending execution for an unacceptably long period of time, which is undesirable.

SUMMARY

The present disclosure is directed to systems and corresponding methods that facilitate live migration of a VM in a computing environment.

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

In accordance with one embodiment, a method for migrating a virtual machine (VM) in a computing environment is provided. The method comprises receiving a request to migrate a VM executing on a source host to a destination host; defining a recovery point to which the VM is restored during recovery from a fault; and iteratively copying a memory of the source host associated with the VM to the destination host.

During the copying, the original state of each page in the memory is preserved. At some point, the VM suspends executing on the source host, copies state information associated with the VM to the destination host, and resumes executing on the destination host. If a fault is detected on the source host, the VM is restored to the recovery point using preserved information.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The claimed subject matter is not, however, limited to any particular embodiment disclosed.

BRIEF DESCRIPTION OF THE DRAWINGS

Embodiments of the claimed subject matter are understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments of the claimed subject matter. Certain embodiments may be practiced without these specific details or with some variations in detail. In some instances, certain features are described in less detail so as not to obscure other aspects of the disclosed embodiments. The level of detail associated with each of the elements or features should not be construed to qualify the novelty or importance of one feature over the others.

Figure 1:
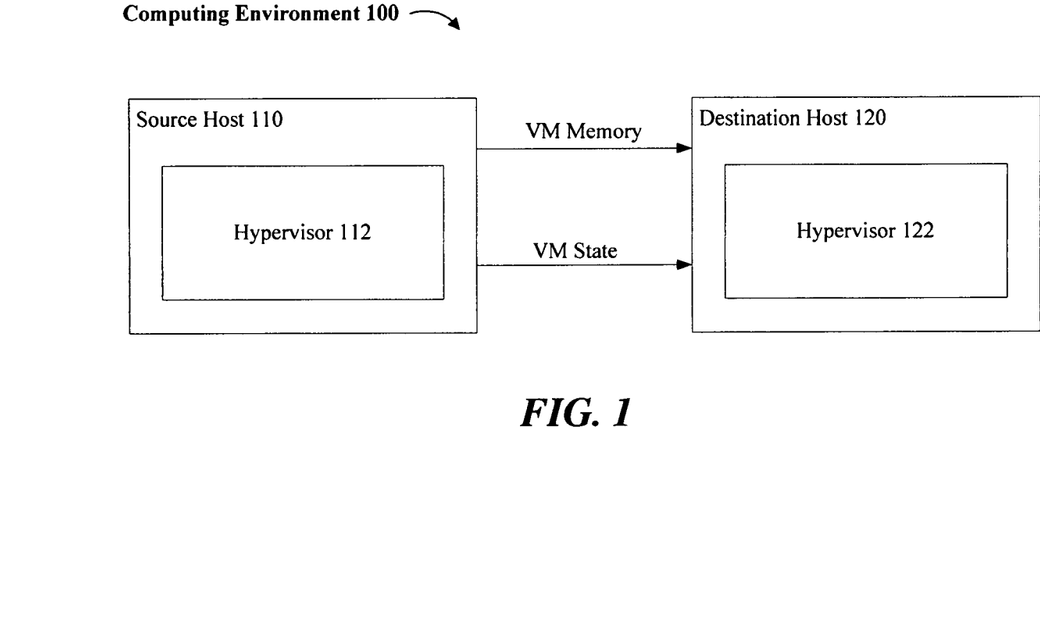
FIG. 1 illustrates an exemplary computing environment, in accordance with one or more embodiments.

Referring to FIG. 1, in accordance with one embodiment, an exemplary computing environment 100 comprises a source host 110 managed by a hypervisor 112 and a destination host 120 managed by a hypervisor 122. The hypervisor 112 and the hypervisor 122 cooperate to migrate a VM executing on the source host 110 to the destination host 120 by transferring memory and state information associated with the VM from the source host 110 to the destination host 120.

Figure 2:
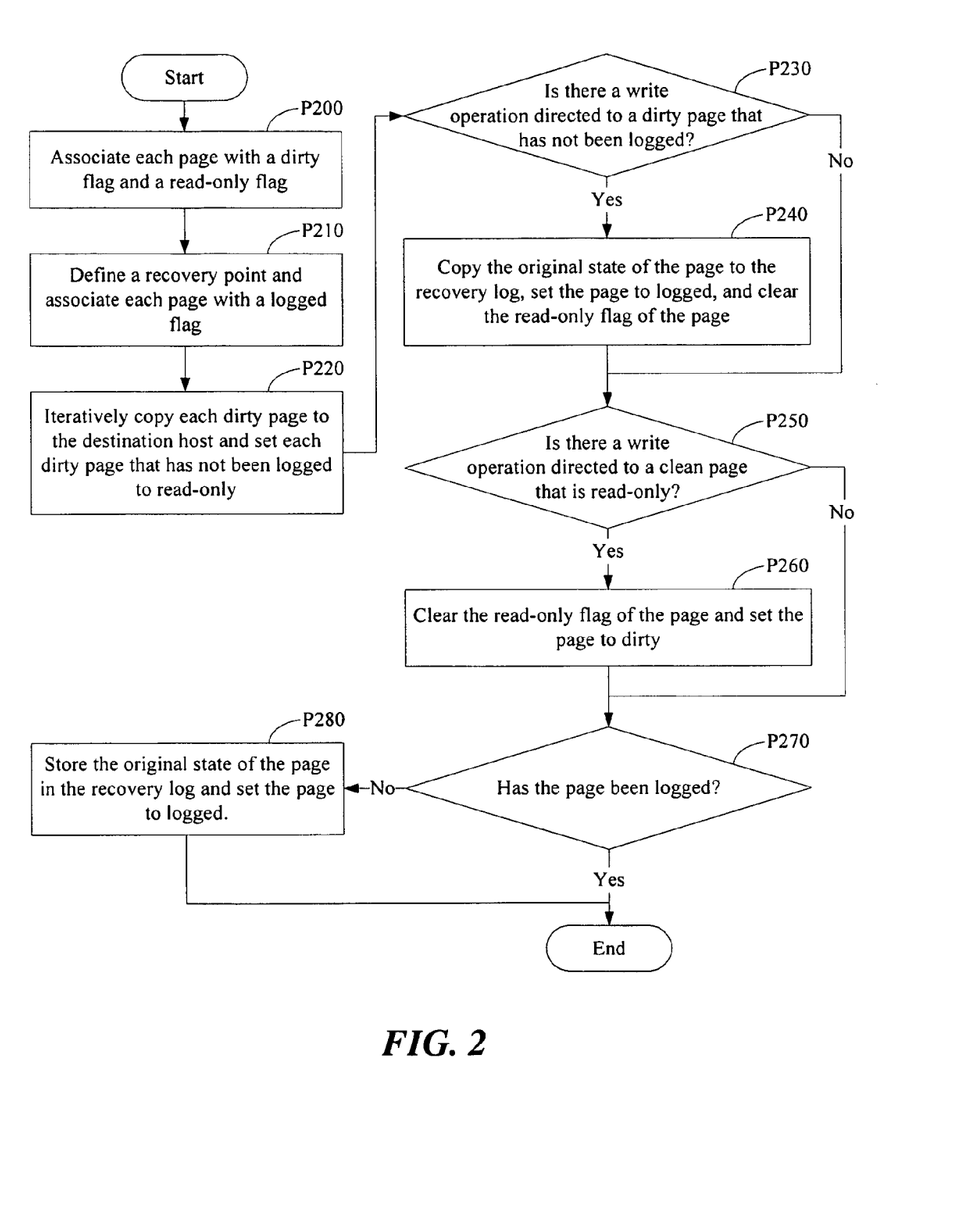
FIG. 2 is a flow diagram of establishing a recovery point for migrating a VM executing on a source host to a destination host, in accordance with one embodiment.

Referring to FIGS. 1 and 2, in accordance with one embodiment, a process for migrating a VM executing on the source host 110 to the destination host 120 is provided. In one implementation, a portion of memory associated with the VM is iteratively transferred from the source host 110 to the destination host 120 as provided in further detail below.

Each page of the VM memory may be associated with a dirty flag and a read-only flag (P200). It is noteworthy that the term flag as used herein refers to an indicator which can be represented by a binary bit (e.g., 1 or 0) or other means to distinguish a first state and a second state for a target page.

A dirty flag indicates that the page has been modified subsequent to being copied to the destination host 120. A read-only flag indicates that the page should not be written to and enables the hypervisors 112 or 122 to detect and respond to write operations directed to the page. Desirably, prior to or at the beginning of the migration, the dirty flag of each page is set, and the read-only flag of each page is cleared.

At the beginning of any iteration of the migration, the hypervisors 112 or 122 may define a recovery point, or a point in time to which the VM may be rolled back (P210). Thus, advantageously, if there is a fault on the source host 110 during a live migration (e.g., while the VM is executing on the destination host 120), the VM may be restored to the state the VM was in at the recovery point and resume execution from the recovery point.

If a recovery point is defined, each page of the VM memory is further associated with a logged flag (P210). A logged flag of a page indicates that the original state of the page (i.e., the state of the page at the recovery point) has been logged, or safely stored in a recovery log maintained at a memory of the destination host 120. Thus, if there is a fault, the recovery log may be used to restore the page to the stored state. Initially, the logged flag of each page is cleared.

Once the recovery point is defined, the hypervisors 112 or 122 copy each page that is dirty to the destination host 120 and set each dirty page that has not been logged to read-only (P220). This process is repeated iteratively until a portion of the VM memory has been transferred to enable the VM to resume execution on the destination host 120 with a certain level of functionality (e.g., minimal interruption).

Setting a page to read-only enables the hypervisors 112 and 122 to detect and respond to write operations directed to dirty pages that have not been logged, in addition to clean pages that were copied to the destination host 120 and set to read-only during previous iterations. Upon detecting write operation directed to a dirty page that has not been logged (P230), the hypervisors 112 or 122 copy the original state of the page to the recovery log, set the page to logged, and clear the read-only flag of the page to enable the write operation (P240).

Upon detecting a write operation directed to a clean page that is read-only (P250), the hypervisors 112 or 122 clear the read-only flag of the page to enable the write operation and set the page to dirty so that the page may be copied to the destination host 120 during a next iteration (P260). If the page has not been logged (P270), the original state of the page is stored in the recovery log, and the page is set to logged (P280).

Advantageously, the hypervisors 112 or 122 do not clear the log flags of any pages in the VM memory. Therefore, each page modified by the source host 110 is logged once with the original state of the page. Also, since the hypervisors 112 or 122 limit the setting of the read-only flag to dirty pages that have not been logged, the number of dirty pages for which the hypervisors 112 or 122 detect and respond to write operations is reduced from one iteration to another as more pages are logged.

Figure 3:
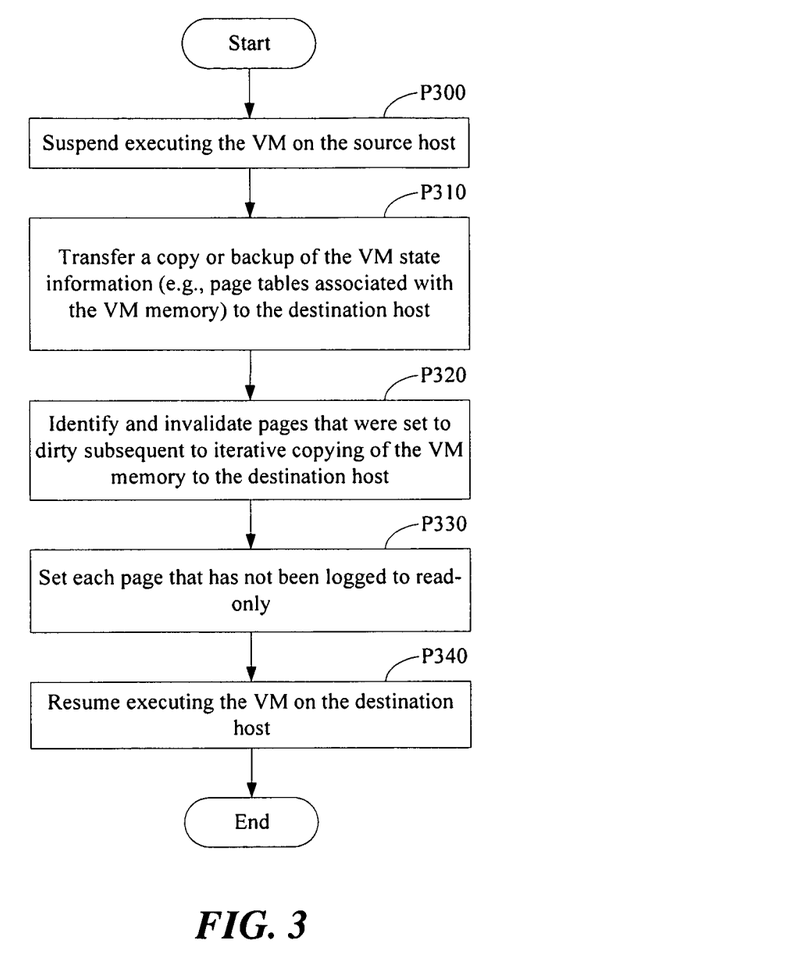
FIG. 3 is a flow diagram of transferring state information for a VM executing on a source host to a destination host, in accordance with one embodiment.

Referring to FIGS. 1 and 3, in accordance with one embodiment, the hypervisors 112 or 122 suspend executing of the VM on the source host 110 (P300) and transfer information associated with the state of the VM from the source host 110 to the destination host 120. For example, the hypervisors 112 or 122 transfer a copy or backup (e.g., a snapshot) of page tables associated with VM memory (P310). A page table is a data structure comprising references to one or more pages of a memory.

Once the VM state is transferred to the destination host 120, the hypervisors 112 or 122 use the VM state to identify and invalidate pages that were set to dirty subsequent to the iterative copying of the VM memory to the destination host 120 (P320). Each identified page that has not been logged is set to read-only to enable the hypervisors 112 or 122 to detect and respond to write operations directed to the page (P330). Upon completing the identifying and invalidating, the hypervisors 112 or 122 resume executing of the VM on the destination host 120 (P340).

Figure 4:
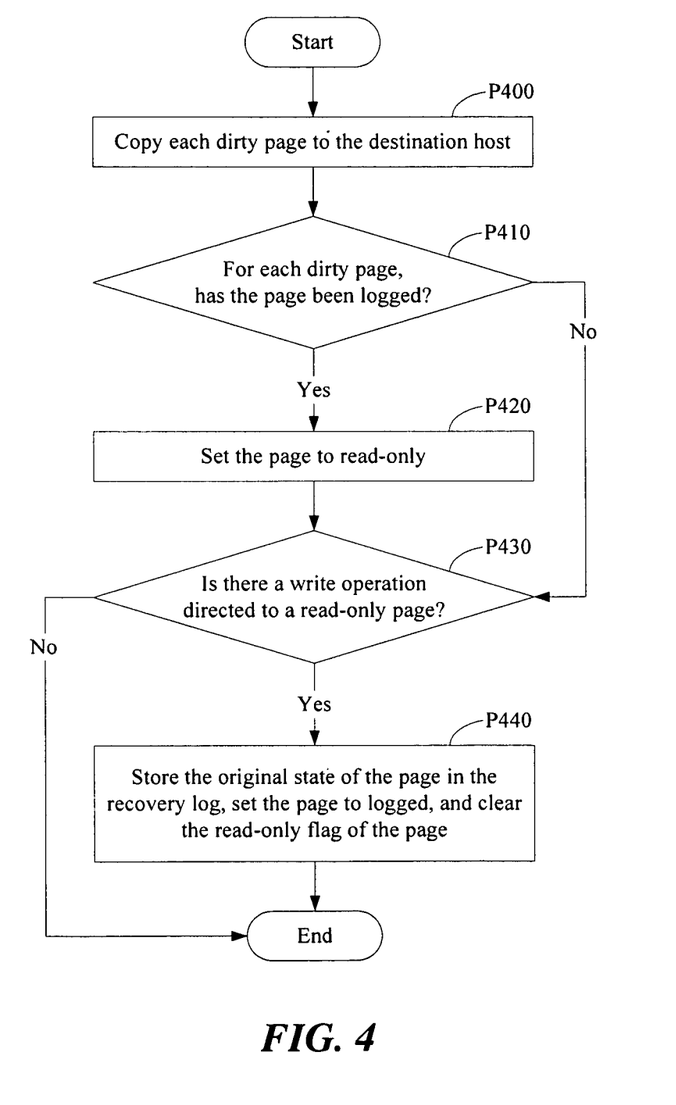
FIG. 4 is a flow diagram of verifying proper migration of a VM executing on a source host to a destination host, in accordance with one embodiment.

Referring to FIGS. 1 and 4, in accordance with one embodiment, the remaining dirty pages of the VM memory are transferred from the source host 110 to the destination host 120.

The hypervisors 112 or 112 copy each dirty page to the destination host 120 (P400). If the page has not been logged (P410), the page is set to read-only to enable the hypervisors 112 or 122 to detect and respond to write operations directed to the page (P420). Upon detecting a write operation to a read-only page (P430), the hypervisors 112 or 122 store the original state of the page in the recovery log, set the page to logged, and clear the read-only flag of the page to enable the write operation (P440).

Accordingly, the hypervisors 112 or 122 copy the original state of each page that is modified by the VM while executing at the destination host 120 to the recovery log. These pages, in addition to the logged pages that were modified by the VM since the recovery point (while the VM was executing on the source host 110) and the pages that have not been modified or logged since the recovery point, enable recovery of the VM, desirably, to its original state at the recovery point, if a fault is detected on the source host 110 during the migration, and particularly during the final stages of migration.

Figure 5:
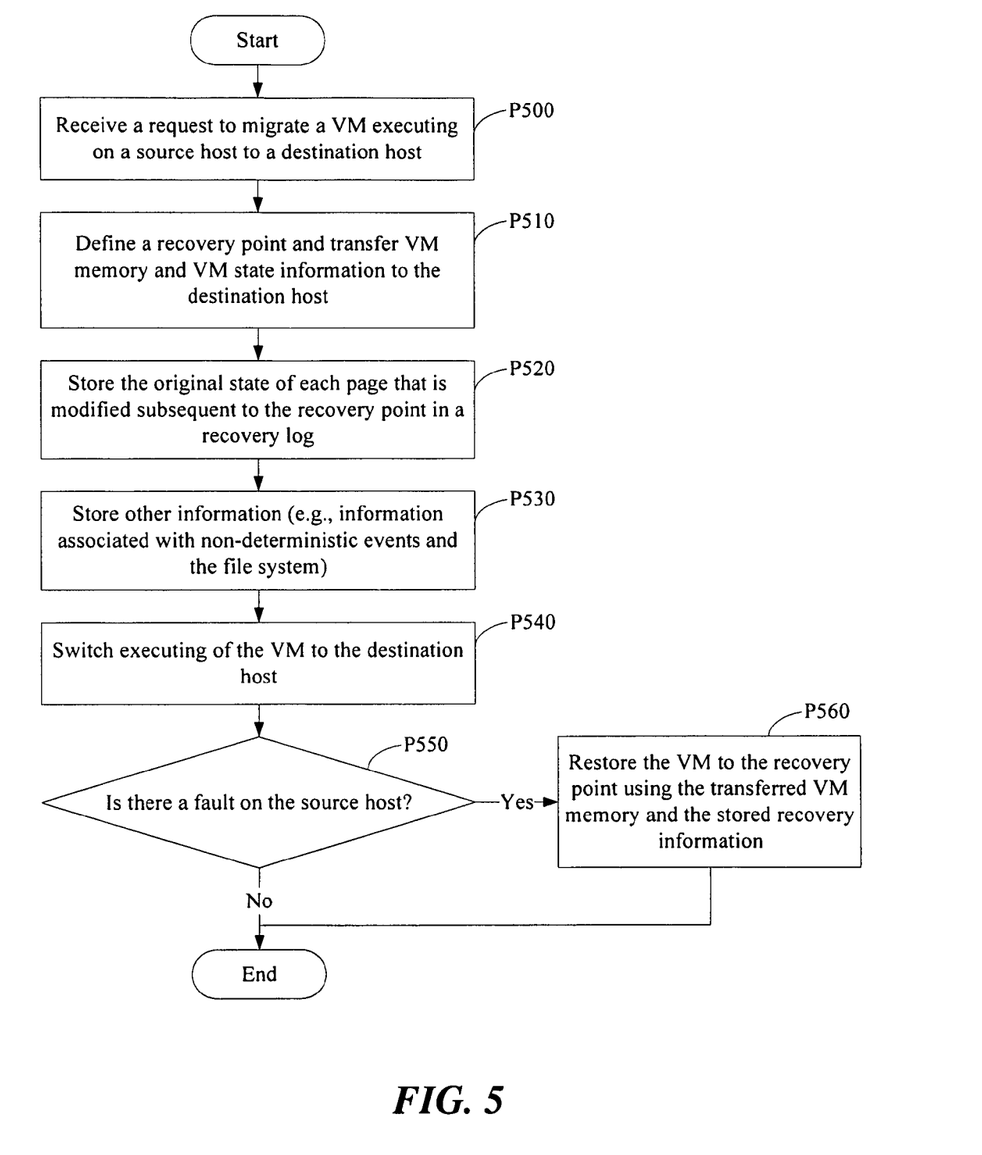
FIG. 5 is a flow diagram of a method for recovering a VM executing on a destination host from a fault occurring during the live migration, in accordance with one embodiment.

Referring to FIGS. 1 and 5, in accordance with one embodiment, the hypervisors 112 or 122 may receive a request to migrate a VM executing on a source host 110 to a destination host 120 (P500). Upon receiving the request, the hypervisors 112 or 122 define a recovery point and transfer pages the VM memory and the VM state to the destination host 120 (P510). The original state of each page that is modified subsequent to the recovery point may be copied to a recovery log maintained at the destination host 120 (P520).

In another embodiment, the hypervisors 112 or 122 may maintain an events log, in addition to the recovery log, regarding nondeterministic events that occur between the recovery point and completing the migration of the VM to the destination host 120 (P530). The events log is desirable if there are interactions with an external source (e.g., a user) that cannot be rolled back. Additionally, file system data may be rolled back using a stackable file system implementation or other implementation suitable for data recovery in a file system (P530).

Once the recovery point is defined and the recovery information is stored, the hypervisors 112 or 122 switch executing of the VM to the destination host 120 (P540). If a fault occurs on the source host 110 while the VM is executing on the destination host 120 (P550), the hypervisors 112 or 122 restore the VM to its original state (e.g., roll the VM back to the recovery point) using one or more of the stored recovery information (P560). For example, in one implementation, the VM memory of the destination host 120 may be used to restore pages that have not been modified since the recovery point, and the recovery log may be used to restore pages that have been modified since the recovery point.

In different embodiments, the claimed subject matter may be implemented either entirely in the form of hardware or entirely in the form of software, or a combination of both hardware and software elements. For example, computing environment 100 may comprise a controlled computing system that can be presented largely in terms of hardware components and software code executed to perform processes that achieve the results contemplated by the system of the claimed subject matter.

Figure 6:
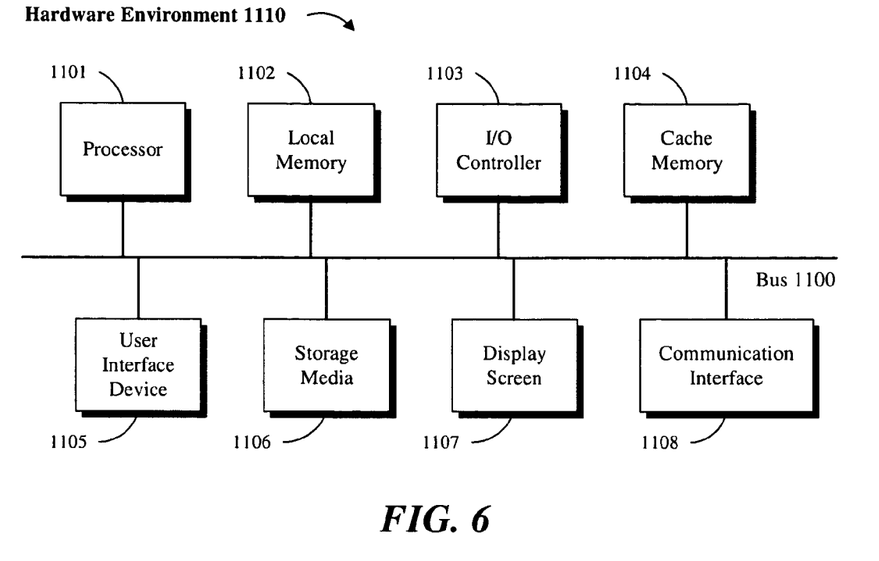
FIGS. 6 and 7 are block diagrams of hardware and software environments in which a system of the present invention may operate, in accordance with one or more embodiments.
Figure 7:
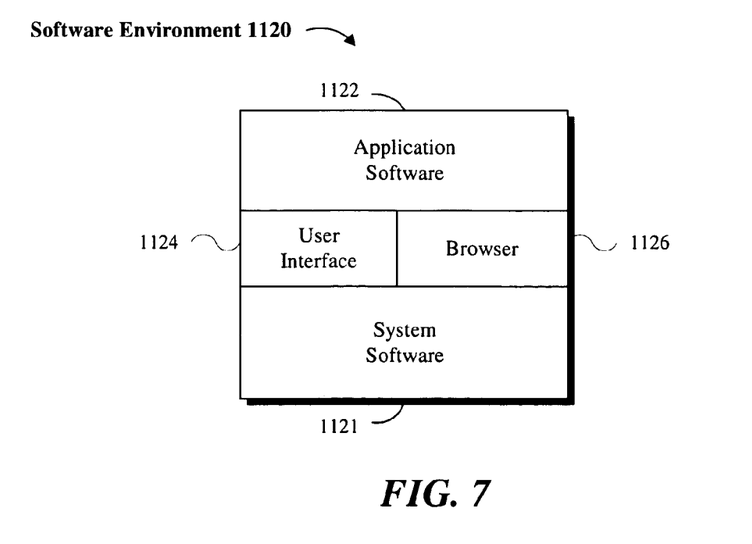

Referring to FIGS. 1, 6, and 7, a computing system in accordance with an exemplary embodiment is composed of a hardware environment 1110 and a software environment 1120. The hardware environment 1110 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1120 is divided into two major classes comprising system software 1121 and application software 1122. System software 1121 comprises control programs, such as the operating system (OS) and information management systems that instruct the hardware how to function and process information.

In one embodiment, the hypervisors 112 or 122 are implemented as application software 1122 executed on one or more hardware environments to facilitate live migration of a VM in the computing environment 100 as provided earlier. Application software 1122 may comprise but is not limited to program code, data structures, firmware, resident software, microcode or any other form of information or routine that may be read, analyzed or executed by a microcontroller.

In an alternative embodiment, the claimed subject matter may be implemented as computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate or transport the program for use by or in connection with the instruction execution system, apparatus or device.

The computer-readable medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 6, an embodiment of the application software 1122 may be implemented as computer software in the form of computer readable code executed on a data processing system such as hardware environment 1110 that comprises a processor 1101 coupled to one or more memory elements by way of a system bus 1100. The memory elements, for example, may comprise local memory 1102, storage media 1106, and cache memory 1104. Processor 1101 loads executable code from storage media 1106 to local memory 1102. Cache memory 1104 provides temporary storage to reduce the number of times code is loaded from storage media 1106 for execution.

A user interface device 1105 (e.g., keyboard, pointing device, etc.) and a display screen 1107 can be coupled to the computing system either directly or through an intervening I/O controller 1103, for example. A communication interface unit 1108, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1110 may not include all the above components, or may comprise other components for additional functionality or utility. For example, hardware environment 1110 can be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1108 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 7, application software 1122 may comprise one or more computer programs that are executed on top of system software 1121 after being loaded from storage media 1106 into local memory 1102. In a client-server architecture, application software 1122 may comprise client software and server software. For example, in one embodiment, client software is executed on a personal computer (not shown) and server software is executed on a server system (not shown).

Software environment 1120 may also comprise browser software 1126 for accessing data available over local or remote computing networks. Further, software environment 1120 may comprise a user interface 1124 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective processes of each method are performed are purely exemplary. Depending on implementation, the processes can be performed in any order or in parallel, unless indicated otherwise in the present disclosure. Further, the logic code is not related, or limited to any particular programming language, and may comprise of one or more modules that execute on one or more processors in a distributed, non-distributed or multiprocessing environment.

The claimed subject matter has been described above with reference to one or more features or embodiments. Those skilled in the art will recognize, however, that changes and modifications may be made to these embodiments without departing from the scope of the claimed subject matter. These and various other adaptations and combinations of the embodiments disclosed are within the scope of the claimed subject matter as defined by the claims and their full scope of equivalents.

What is claimed is:

1. A method of migrating a virtual machine (VM) in a computing environment, the method comprising:
    receiving a request to migrate a VM executing on a source host to a destination host;
    defining a recovery point to which the VM is restored during recovery from a fault; and
    iteratively copying pages in memory of the source host associated with the VM to the destination host,
    wherein the iterative copying comprises maintaining a record of pages in the memory that have been copied to the destination host,
    wherein a page in the memory is associated with a first flag to indicate that the page has not been copied to the destination host or has been modified subsequent to being copied to the destination host,
    wherein a page in the memory is associated with a second flag to indicate that the page is permitted to be written to,
    wherein a page in the memory is associated with a third flag to indicate that an original state of the page has not been preserved,
    wherein if a write operation is directed to a first page associated with the first flag and the third flag, an original state of the first page is preserved and the association between the first page and the third flag is terminated,
    wherein if a write operation is directed to a first page associated with the second flag, the association between the first page and the second flag is terminated and the first page is associated with the first flag, and if the first page is associated with the third flag, an original state of the first page is preserved and the association between the first page and the third flag is terminated.

2. The method claim 1, further comprising preserving an original state of each page in the memory.

3. The method of claim 2, wherein the preserving comprises storing an original state of each page in the memory in a recovery log maintained at the destination host.

4. The method of claim 1, further comprising copying state information associated with the VM to the destination host.

5. The method of claim 4, further comprising:
    identifying each page that was written to subsequent to the iteratively copying using the state information; and
    copying the identified pages to the destination host.

6. The method of claim 1, further comprising suspending executing of the VM on the source host and resuming executing of the VM on the destination host.

7. The method of claim 1, further comprising:
    detecting a fault on the source host; and
    restoring the VM to the recovery point using preserved information.

8. The method of claim 7, wherein the preserved information is related to at least one of an original state of a page in the memory, non-deterministic events, or a file system.

9. A system of migrating a virtual machine (VM) in a computing environment, the system comprising:
    one or more processors in communication one or more logic units;
    a logic unit for receiving a request to migrate a VM executing on a source host to a destination host;
    a logic unit for defining a recovery point to which the VM is restored during recovery from a fault; and
    a logic unit for iteratively copying pages in memory of the source host associated with the VM to the destination host,
    wherein the iterative copying comprises maintaining a record of pages in the memory that have been copied to the destination host and recopying said pages to the destination host, in response to determining that said pages have been updated prior to migration of the VM,
    wherein a page in the memory is associated with a first flag to indicate that the page has not been copied to the destination host or has been modified subsequent to being copied to the destination host,
    wherein a page in the memory is associated with a second flag to indicate that the page is permitted to be written to,
    wherein a page in the memory is associated with a third flag to indicate that an original state of the page has not been preserved,
    wherein if a write operation is directed to a first page associated with the first flag and the third flag, an original state of the first page is preserved and the association between the first page and the third flag is terminated,
    wherein if a write operation is directed to a first page associated with the second flag, the association between the first page and the second flag is terminated and the first page is associated with the first flag, and if the first page is associated with the third flag, an original state of the first page is preserved and the association between the first page and the third flag is terminated.

10. A computer program product comprising a non-transitory computer data storage medium having logic code stored thereon, wherein the logic code when executed on a computer causes the computer to:
    receive a request to migrate a virtual machine (VM) executing on a source host to a destination host;
    define a recovery point to which the VM is restored during recovery from a fault; and
    iteratively copy pages in memory of the source host associated with the VM to the destination host,
    wherein the iterative copying comprises maintaining a record of pages in the memory that have been copied to the destination host and recopying said pages to the destination host, in response to determining that said pages have been updated prior to migration of the VM,
    wherein a page in the memory is associated with a first flag to indicate that the page has not been copied to the destination host or has been modified subsequent to being copied to the destination host,
    wherein a page in the memory is associated with a second flag to indicate that the page is permitted to be written to, wherein a page in the memory is associated with a third flag to indicate that an original state of the page has not been preserved, wherein if a write operation is directed to a first page associated with the first flag and the third flag, an original state of the first page is preserved and the association between the first page and the third flag is terminated, wherein if a write operation is directed to a first page associated with the second flag, the association between the first page and the second flag is terminated and the first page is associated with the first flag, and if the first page is associated with the third flag, an original state of the first page is preserved and the association between the first page and the third flag is terminated.

* * * * *